US009915818B2

(12) United States Patent
Lin et al.

(10) Patent No.: US 9,915,818 B2

(45) Date of Patent: Mar. 13, 2018

(54) END STRUCTURE FOR ENDOSCOPE

(71) Applicant: Himax Technologies Limited, Tainan (TW)

(72) Inventors: Han-Ching Lin, Tainan (TW); Yin-Dong Lu, Tainan (TW)

(73) Assignee: HIMAX TECHNOLOGIES LIMITED, Tainan (TW)

(*) Notice: Subject to any disclaimer, the term of this patent is extended or adjusted under 35 U.S.C. 154(b) by 107 days.

(21) Appl. No.: 14/661,016

(22) Filed: Mar. 18, 2015

(65) Prior Publication Data

US 2016/0274349 A1 Sep. 22, 2016

(51) Int. Cl.

*G02B 3/02* (2006.01)
*G02B 13/18* (2006.01)
*G02B 23/24* (2006.01)
*G02B 13/00* (2006.01)

(52) U.S. Cl.

CPC ....... *G02B 23/243* (2013.01); *G02B 13/0025* (2013.01)

(58) Field of Classification Search

CPC ...................................................... G02B 7/027
USPC ......... 359/718; 600/101, 105–107, 114, 120, 600/127, 128, 129, 154, 171, 175, 176
See application file for complete search history.

(56) References Cited

U.S. PATENT DOCUMENTS 6,239,922 B1 5/2001 Nakamura
2008/0080061 A1* 4/2008 Miyano ................ G02B 23/243 359/661
2009/0009887 A1* 1/2009 Chen ...................... G02B 13/04 359/753
2014/0128673 A1* 5/2014 Cheng .................... G02B 13/06 600/109

FOREIGN PATENT DOCUMENTS

TW 434415 5/2001
TW I287444 10/2007

* cited by examiner

*Primary Examiner* — Bumsuk Won
*Assistant Examiner* — Tamara Y Washington
(74) *Attorney, Agent, or Firm* — McClure, Qualey & Rodack, LLP

(57) ABSTRACT

An imaging lens system includes a lens and a transparent plate. The lens is disposed between an object and a sensor, and the lens includes a flat surface facing the object and an aspheric surface facing the sensor. The transparent plate is connected to the lens and disposed between the object and the lens. An abbe number of the lens is in a range from 30 to 50, an abbe number of the transparent plate is in a range from 40 to 60, and an effective focal length (EFL) of the imaging lens system is in a range from about 0.3 millimeters to about 0.4 millimeters.

16 Claims, 5 Drawing Sheets

100
130 120 110
300
200 132
310
W1 D1
D2
A
S1
S2
S2' S3

END STRUCTURE FOR ENDOSCOPE

BACKGROUND

Field of Invention

The present invention relates to a lens system, and more particularly to an imaging lens system.

Description of Related Art

Endoscopes generally include a series of lenses used to convey an image of a scene viewed from a distal end of the endoscope to a proximal end, where an image sensor may capture the image. Some mucus, such as gastric juice or chyme may exist in the environment where the endoscopes are used. For protecting the lenses from contamination and ensuring the light entrance, the endoscope includes a cover glass between the lenses and the scene, so that the mucus in the scene/environment can be blocked by the cover glass and light can travel through the cover glass toward the lenses.

However, the cover glass may not coordinate with the lenses effectively. For example, a portion of light passing through the cover glass may not pass through the lenses. Also, due to the size of the cover glass and the distance between the lenses and the cover glass, the endoscopes may have a long length and a long width that are disadvantage to the miniaturization of the endoscopes. Therefore, there is a desire to modify the configuration of the cover glass and the lenses.

SUMMARY

The invention is related to an imaging lens system utilized in an endoscope.

According to one embodiment of the present invention, an imaging lens system includes a lens and a transparent plate. The lens is disposed between an object and a sensor, and the lens includes a flat surface facing the object and an aspheric surface facing the sensor. The transparent plate is connected to the lens and disposed between the object and the lens. An abbe number of the lens is in a range from 30 to 50, an abbe number of the transparent plate is in a range from 40 to 60, and an effective focal length (EFL) of the imaging lens system is in a range from about 0.3 millimeters to about 0.4 millimeters.

Based on the above description, according to the exemplary embodiments of the invention, due to the abbe numbers of the lens and the transparent plate and the effective focal length of the imaging lens system, the imaging lens system has good imaging quality and a small size.

It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiment, with reference made to the accompanying drawings as follows.

DETAILED DESCRIPTION

Figure 1:
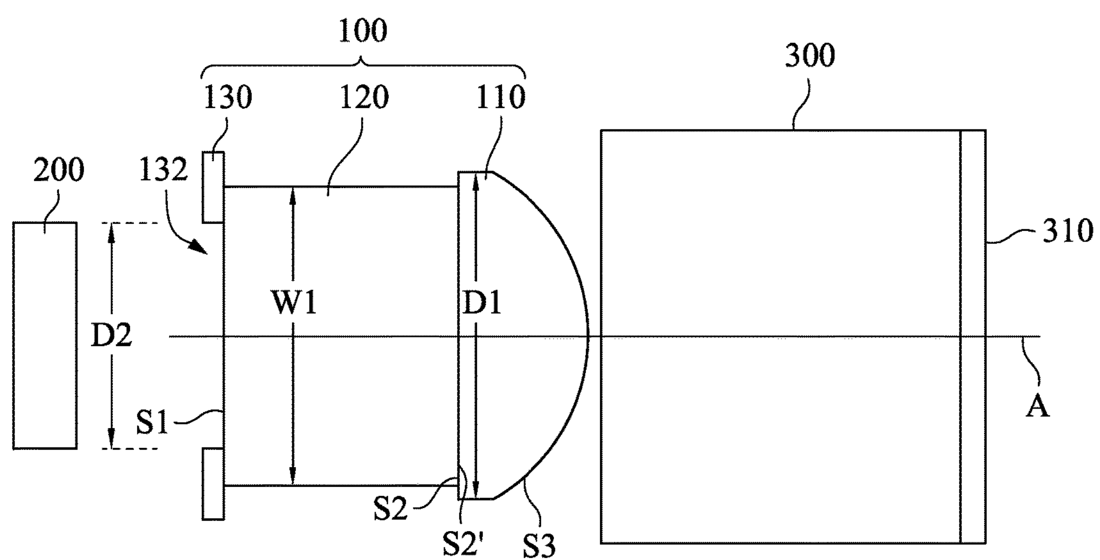
FIG. 1 is a schematic structural diagram of an imaging lens system according to an embodiment of the invention.

Reference will now be made in detail to the present embodiments of the invention, examples of which are illustrated in the accompanying drawings. Wherever possible, the same reference numbers are used in the drawings and the description to refer to the same or like parts.

FIG. 1 is a schematic structural diagram of an imaging lens system 100 according to an embodiment of the invention. The imaging lens system 100 includes a lens 110 and a transparent plate 120. The lens 110 is disposed between an object 200 and a sensor 300, and the lens 110 includes a flat surface S2 facing the object 200 and an aspheric surface S3 facing the sensor 300. The transparent plate 120 is connected to the lens 110 and disposed between the object 200 and the lens 110. In this embodiment, an abbe number of the lens 110 is in a range from 30 to 50, an abbe number of the transparent plate 120 is in a range from 40 to 60, and an effective focal length (EFL) of the imaging lens system 100 is in a range from about 0.3 millimeters to about 0.4 millimeters.

In one or more embodiments, the aspheric surface S3 is convex. The aspheric surface S3 can focus the light passing through itself to an image plane 310 of the sensor 300. The aspheric surface S3 have a curvature in a range from −0.17 millimeters to −0.20 millimeters to generate the aforementioned effective focal length of the imaging lens system 100.

The transparent plate 120 can include a surface S1 facing the object 200 and a surface S2' opposite the surface S1. In one or more embodiments, the surface S2' is connected to the flat surface S2 of the lens 110, so that the transparent plate 120 is connected to the lens 110. The flat surface S2, the aspheric surface S3, the surface S1, and the surface S2' are arranged along an optical axis A.

In one or more embodiments, the transparent plate 120 can be a flat plate suitable for the package of endoscopes. For examples, in the wafer level lens manufacturing processes, the imaging lens system 100 having the lens 110 and the transparent plate 120 may be one of the pieces cut from a flat transparent substrate with plural micro lens formed on, but the invention is not limit thereto as well. In some embodiments, the transparent plate 120 can be a bent plate or a lens suitable for the package of endoscopes. The transparent plate 120 can be a cover glass of the endoscopes, and the transparent plate 120 can protect the lens 110 from contamination and ensuring the light entrance.

In one or more embodiments, the surface S1 or the surface S2' is smaller than the flat surface S2 of the lens 110. To be specific, a diameter D1 of the flat surface S2 is longer than a width W1 of the surface S1 or the surface S2'. That is, the size of the transparent plate 120 that light travel through is smaller than the size of the lens 110 that light travel through.

In one or more embodiments, a difference between the refractive index of the lens 110 and the refractive index of the transparent plate 120 is less than 0.1. In some embodiments, the refractive indexes of the lens 110 and the transparent plate 120 are both in the range from about 1.5 to about 1.6. The similar refractive indexes may reduce the reflection between the different materials and may also prevent the internal total reflection when light propagated through the interfaces between the lens 110 and the transparent plate 120. Therefore, the image brightness may be improved due to the reduction of the reflection resulted from the interfaces.

In some embodiments, the lens 110 and the transparent plate 120 can be made of the same material or different materials, such as transparent glass, resin, et cetera.

In one or more embodiments, the thickness of the transparent plate 120 is in a range from 0.2 millimeters to 0.6 millimeters, and the thickness of the lens 110 is in range from 0.1 millimeters to 0.3 millimeters.

In one or more embodiments, the imaging lens system 100 includes an aperture stop 130 disposed on the surface S1 of the transparent plate 120. The aperture stop 130 can control the amount of light entering the imaging lens system 100. In this embodiment, an opening 132 of the aperture stop 130 has a diameter D2, which can be smaller than the width W1 of the surface S1, but it should not limit the scope of the present invention.

Traditionally, since the configuration of the cover glass usually to have a larger aperture size than the smallest aperture size of the lenses, a portion of light passing through the cover glass may not pass the lens system. In the embodiment, since the size of the transparent plate 120 that light travel through is smaller than the size of the lens 110 that light travel through, the width of the imaging lens system 100 can be reduced, and the light traveling through the transparent plate 120 can substantially pass through the lens 110. That is, the width of the imaging lens system 100 is not limited to the size of the cover glass.

In addition to reducing the width of the imaging lens system 100, the length of the imaging lens system 100 can be decreased by designing the aspheric surfaces. In one or more embodiments, it is designed that the effective focal length of the imaging lens system 100 is mainly based on the curvature of the aspheric surface S3 of the lens 110, so that the distance between the lens 110 and the transparent plate 120 does not seriously affect the effective focal length of the imaging lens system 100. Therefore, the lens 110 can be directly attached to the cover glass, which is the transparent plate 120, and no space is left between the cover glass and the lens 110.

Also, the problem of the aberrations resulted from single aspheric surface can be reduced by selecting the desired materials of the lens 110 and the transparent plate 120 having the desired abbe numbers, which is related to the dispersion of materials, and therefore it is not necessary to dispose other optical elements having an aspheric surface in the imaging lens system 100 to eliminate the aberrations. As a result, the size of the imaging lens system 100 can be reduced by coordinating the lens 110 and the transparent plate 120 without lowering the imaging quality.

Figure 2:
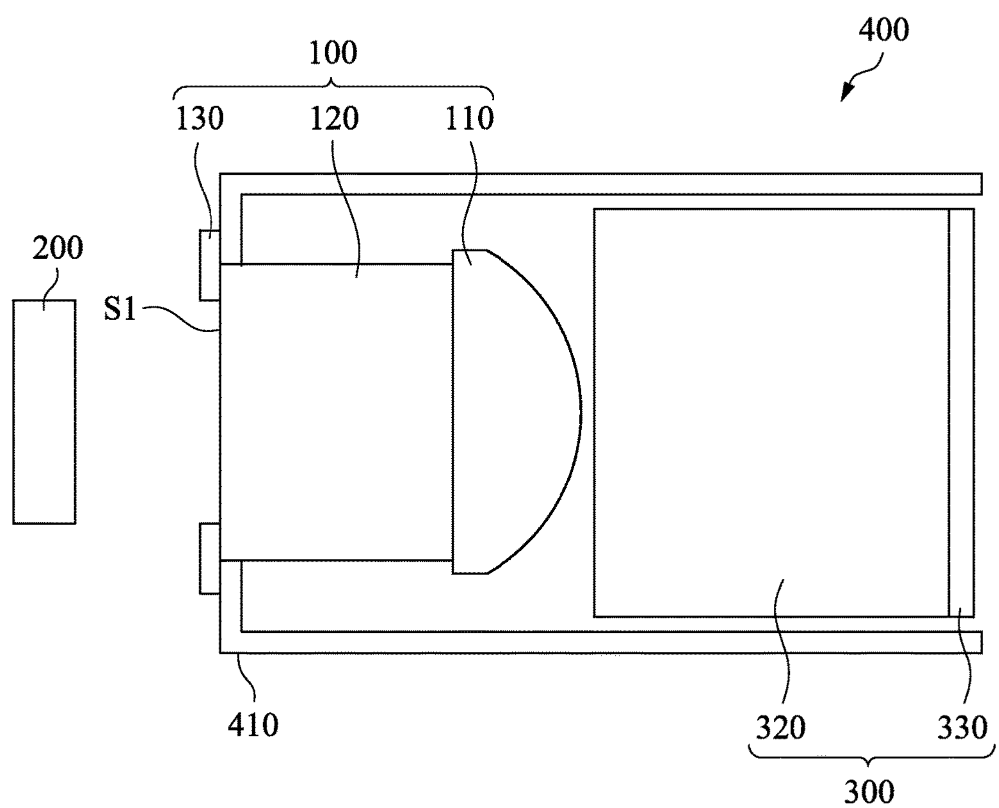
FIG. 2 is a schematic view of an endoscope having the imaging lens system of FIG. 1.

FIG. 2 is a schematic view of an endoscope 400 having the imaging lens system 100 of FIG. 1. An outer surface 410 of the endoscope 400 includes the surface S1 of the transparent plate 120 facing the object 200. The mucus in the scene/environment can be blocked outside from the surface S1.

In addition to the imaging lens system 100, the endoscope 400 includes a sensor 300, which is used to capture the image and process the image to electrical signals. The sensor 300 may include a sensor cover glass 320 and a sensor unit 330, and the sensor cover glass 320 can protect the sensor unit 330 from being destroyed.

Though the endoscope 400 is designed to receive light from a bottom end as shown in the figure, it should not limit the scope of the present invention. The endoscope 400 can be designed to receive light from a lateral side. The configuration of the endoscope 400 is only depicted briefly herein, and the detail in the drawing should not limit the scope of the present invention.

An embodiment of the imaging lens system 100 is provided below in accordance with FIG. 1 and FIG. 2. It should be noticed that data listed in following Table 1 and Table 2 are not used to limit the scope of the present invention, and those skilled in the art can suitably change the parameters or settings therein without departing from the scope of the invention.

TABLE 1

| Surface | Type | Radius of curvature (mm) | Thickness | Material | | Conic |
|---|---|---|---|---|---|---|
| OBJ | — | Infinity | 3 | Refractive index | Abbe number | 0 |
| 1 | Transparent plate | Infinity | 0.3 | 1.51 | 61.6 | * |
| 2 | Lens | Infinity | 0.16 | 1.52 | 48.7 | 0 |
| 3 | | −0.204 | 0.007 | air | | −0.979 |
| 4 | Sensor cover glass | Infinity | 0.6 | 1.51 | 61.6 | 0 |
| 5 | Sensor unit | Infinity | 0.033 | 1.51 | 61.6 | 0 |
| IMA | — | Infinity | | | | 0 |

In Table 1, the surface 1, surface 2 and surface 3 refer to the surface S1, flat surface S2 and aspheric surface S3 respectively, which are the interface between air and the transparent plate 120, the interface between the transparent plate 120 and the lens 110, and the interface between the lens 110 and air. The surface 4 refers to the interface between air and the sensor cover glass 320. The surface 5 refers to the interface between the sensor cover glass 320 and the sensor unit 330. The surface OBJ and the surface IMA refer to a position of the object and the image plane 310 respectively.

It is noted that the aperture stop 130 of the imaging lens system 100 is disposed at the surface 1 (surface S1).

The plus and minus signs for the radius of curvature represents the direction of the surface. In this embodiment, a positive paraxial radius of curvature means an aspheric surface having the positive paraxial radius of curvature curves towards the object side on the optical axis of the imaging lens, and a negative paraxial radius of curvature means an aspheric surface having the negative paraxial radius of curvature curves towards the image side on the optical axis of the imaging lens.

The thickness refers to a linear distance along the optical axis A between two neighboring surfaces. For example, the thickness of surface 1 in Table 1 is the linear distance along the optical axis A between the surface S1 and the surface S2/S2', and that is, the thickness of the surface 1 in Table 1 represents the thickness of the transparent plate 120. The thickness of the surface 2 in Table 1 is the linear distance along the optical axis A between the surface S2/S2' and the aspheric surface S3, and that is the thickness of the surface 2 in Table 1 represents the thickness of the lens 110. The thickness of the surface 3 in Table 1 indicates the distance between the lens 110 and the sensor cover glass 320. The thickness of the surface 4 in Table 1 is the thickness of the sensor cover glass 320.

The refractive index and abbe number corresponding to each of the elements indicated in “Type” can be found in the corresponding values from each row. The radius of curvature, the distance, abbe numbers, and other parameters are shown in Table 1, and the design of the imaging lens system 100 fully satisfies the conditions mentioned above.

The above surface 3 (aspheric surface S3) is an aspheric surface expressed by the following formula:

$$Z(r) = \frac{cr^2}{1+\sqrt{1-(1+k)c^2r^2}} + \alpha_1 r^2 + \alpha_2 r^4 + \alpha_3 r^6 + \alpha_4 r^8 + \alpha_5 r^{10} + \alpha_6 r^{12} + \alpha_7 r^{14} + \alpha_8 r^{16}$$

In the formula, Z(r) is a sag of the displacement of the surface from the vertex or the related perpendicular line in the direction of the optical axis A, c is the inverse of the radius of an osculating sphere, i.e. the inverse of the radius of curvature (e.g. the radius of curvature of aspheric surface S3 in the Table 1) close to the optical axis A, k is a conic coefficient, which is mentioned in table 1, r is a height of an aspheric surface, i.e. a height from a center to an edge of a lens, and $\alpha_1$-$\alpha_8$ are aspheric coefficients. In the present embodiment, the coefficient $\alpha_1$ is 0. The other parameters $\alpha_2$-$\alpha_8$ of the surfaces 3 are listed in Table 2.

TABLE 2

| Surface 3: even aspheric surface |
|---|
| Coeff on $r^4$: −16.099352 |
| Coeff on $r^6$: 1829.7463 |
| Coeff on $r^8$ : −120617 |
| Coeff on $r^{10}$: 4332078.2 |

Figure 3A:
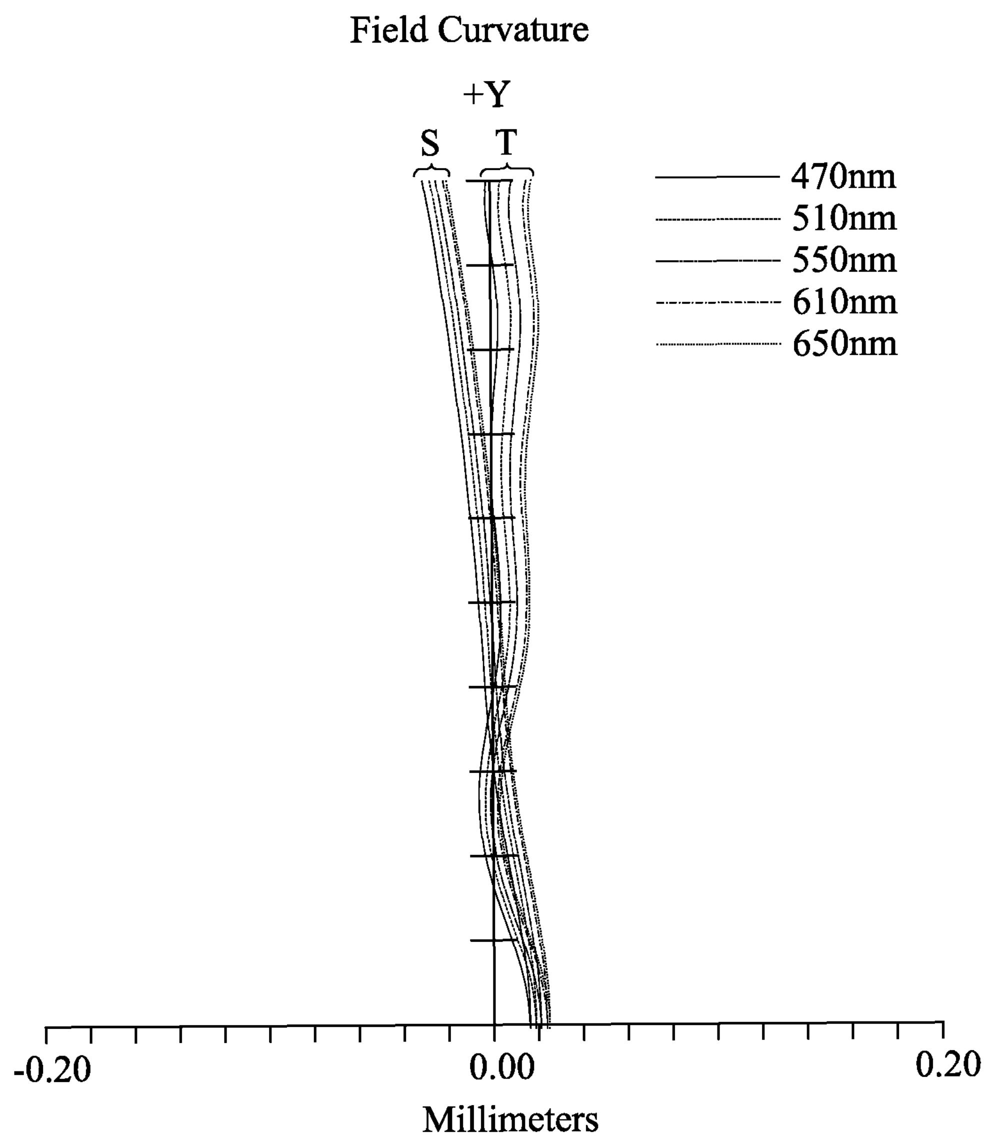
FIG. 3A is an imaging optical simulation data diagrams of field curvature of the imaging lens system of FIG. 1.
Figure 3B:
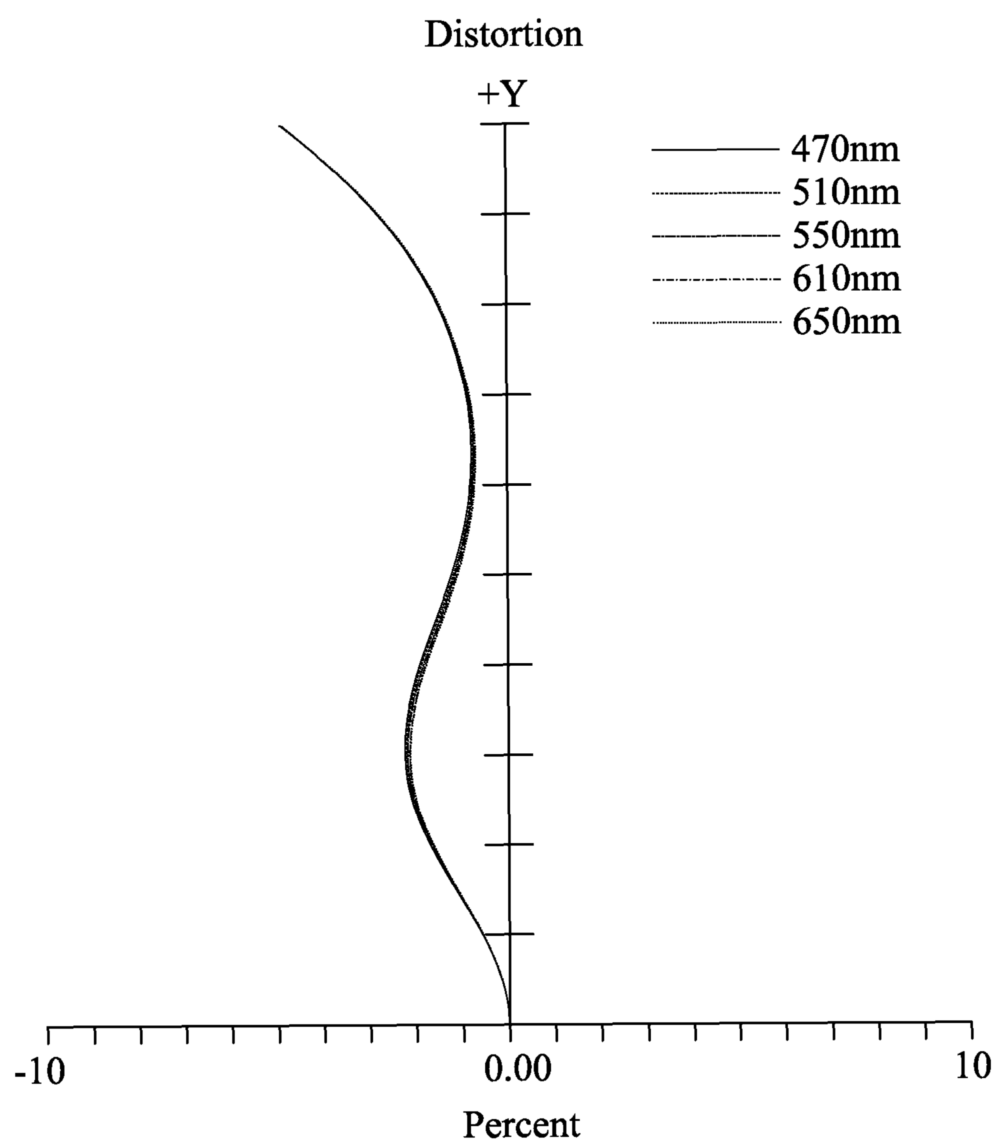
FIG. 3B is an imaging optical simulation data diagrams of distortion of the imaging lens system of FIG. 1.
Figure 3C:
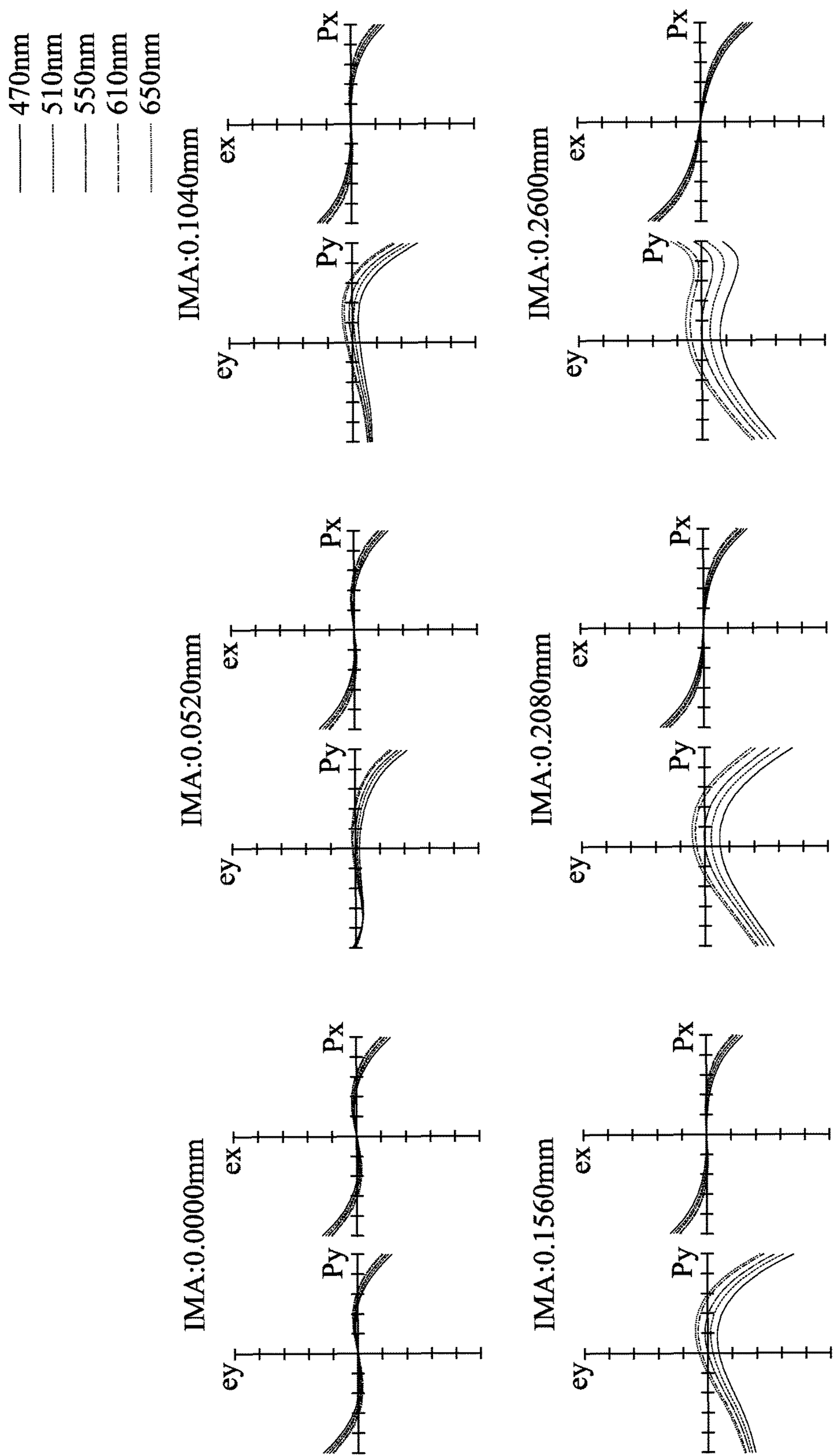
FIG. 3C is an imaging optical simulation data diagrams of the transverse ray fan plot of the imaging lens system of FIG. 1.

FIG. 3A to FIG. 3C are the simulation result of the imaging lens system according to Table 1 and Table 2. In detail, FIG. 3A is an imaging optical simulation data diagrams of field curvature of the imaging lens system of FIG. 1. FIG. 3B is an imaging optical simulation data diagrams of distortion of the imaging lens system of FIG. 1. FIG. 3C is an imaging optical simulation data diagrams of the transverse ray fan plot of the imaging lens system of FIG. 1.

In FIG. 3A, the field of curvatures labeled S represent the sagittal focal surfaces and the field of curvatures labeled T represent the tangential focal surfaces. The maximum field is 40.826 degrees. According to FIG. 3A and FIG. 3B, it is known that the distortions of multi-wavelength images (e.g. 650 nm, 610 nm 550 nm, 510 nm, and 470 nm) are similar in the imaging lens system 100 of the present embodiment, and thus the chromatic aberration of the imaging lens system 100 is unobvious. Moreover, the difference between the sagittal and the tangential field of curvature are small when the aperture of the imaging lens system 100 is set in an appropriate diameter, and thus the quality of the image formed by the imaging lens system 100 is good. Therefore, the imaging lens system 100 may provide good imaging quality while maintaining a miniaturized size, and thus may be suitable to be applied in endoscopes.

FIG. 3C is the transverse ray fan plot of the imaging lens system 100. The transverse ray fan plot shows the aberration on or near the image plane 310, which is the IMA surface in Table 1. The numbers labeled after the IMA represent the image height or the field height on sensor, and the five curves in each plot represent the tested five wavelength of the light (e.g. 650 nm, 610 nm, 550 nm, 510 nm, and 470 nm) of the image respectively. It is obvious that the aberrations on or near the image plane 310 are similar and unobvious in paraxial light. The maximum scale of this plot is ±20 micrometers.

The off-axial aberrations of light with larger wavelengths such as 650 nanometers and 610 nanometers in the present embodiment can also be controlled within the imaging lens system 100 since the size may be miniaturized to an appropriate size. Therefore, the imaging lens system 100 may provide good image quality as well as miniaturized size.

In summary, according to the exemplary embodiments of the invention, due to the abbe numbers of the lens and the transparent plate and the effective focal length of the imaging lens system, the distortion, the field of curvature, and the off-axial aberrations can be reduced, and the imaging lens system can be miniaturized without lowering the image quality.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. An end structure for an endoscope, comprising:

a lens disposed between an object and a sensor, wherein the lens comprises a flat surface facing the object and an aspheric surface facing the sensor;

a transparent plate connected to the lens and disposed between the object and the lens, wherein an abbe number of the lens is in a range from 30 to 50, an abbe number of the transparent plate is in a range from 40 to 60, and an effective focal length (EFL) of the end structure is in a range from about 0.3 millimeters to about 0.4 millimeters, wherein the transparent plate comprises a surface facing the object; and an aperture stop directly disposed on and in contact of the surface of the transparent plate, wherein the transparent plate is between the aperture stop and the lens.

2. The end structure of claim 1, wherein the refractive indexes of the lens and the transparent plate are both in the range from about 1.5 to about 1.6.

3. The end structure of claim 1, wherein the flat surface is connected to the transparent plate.

4. The end structure of claim 1, wherein the thickness of the transparent plate is in a range from 0.2 millimeters to 0.6 millimeters, and the thickness of the lens is in range from 0.1 millimeters to 0.3 millimeters.

5. The end structure of claim 1, wherein the aspheric surface is convex.

6. The end structure of claim 1, wherein the transparent plate is a flat plate.

7. The end structure of claim 1, wherein an outer surface of the endoscope comprises the surface of the transparent plate facing the object.

8. The end structure of claim 1, wherein the lens and the transparent plate are made of different materials.

9. The end structure of claim 1, wherein a difference between the refractive index of the lens and the refractive index of the transparent plate is less than 0.1.

10. An end structure for an endoscope, comprising:

a lens disposed between an object and a sensor, wherein the lens comprises a flat surface facing the object and an aspheric surface facing the sensor;

a transparent plate connected to the lens and disposed between the object and the lens, wherein an outer surface of the endoscope comprises a surface of the transparent plate facing the object; and an aperture stop directly disposed on and in contact of the surface of the transparent plate, wherein the transparent plate is between the aperture stop and the lens.

11. The end structure of claim 10, wherein the flat surface is connected to the transparent plate.

12. The end structure of claim 10, wherein the aspheric surface is convex.

13. The end structure of claim 10, wherein the transparent plate is a flat plate.

14. The end structure of claim 10, wherein the lens and the transparent plate are made of different materials.

15. The end structure of claim 10, wherein a difference between the refractive index of the lens and the refractive index of the transparent plate is less than 0.1.

16. The end structure of claim 10, wherein an outer surface of the endoscope comprises the surface of the transparent plate facing the object.

* * * * *